US006493819B1

(12) United States Patent
Mahurin et al.

(10) Patent No.: US 6,493,819 B1
(45) Date of Patent: Dec. 10, 2002

(54) MERGING NARROW REGISTER FOR RESOLUTION OF DATA DEPENDENCIES WHEN UPDATING A PORTION OF A REGISTER IN A MICROPROCESSOR

(75) Inventors: Eric W. Mahurin, Austin, TX (US); Scott A. White, Austin, TX (US); Michael T. Clark, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/442,209

(22) Filed: Nov. 16, 1999

(51) Int. Cl.[7] .............................. G06F 9/30; G06F 9/34
(52) U.S. Cl. .................... 712/210; 712/213; 712/217
(58) Field of Search .................... 712/23.237, 217, 712/245, 218, 226, 216, 227, 206, 248, 212, 215, 210, 213, 221.211, 223.23; 714/15, 17; 711/214, 216, 204.212, 171, 213, 172–220; 710/65, 66; 708/238

(56) References Cited

U.S. PATENT DOCUMENTS

| 4,982,402 A | * | 1/1991 | Beaven et al. ................. 714/15 |
| 5,615,385 A | | 3/1997 | Fetterman et al. ............. 712/23 |
| 5,768,555 A | | 6/1998 | Tran et al. .................... 712/216 |
| 5,790,826 A | | 8/1998 | Thusoo et al. ............... 712/216 |
| 5,878,244 A | | 3/1999 | Witt et al. .................... 712/218 |
| 5,881,259 A | | 3/1999 | Glass et al. .................. 712/210 |
| 5,903,741 A | | 5/1999 | Witt et al. .................... 712/218 |
| 6,334,183 B1 | * | 12/2001 | Blomgren et al. ........... 712/221 |

FOREIGN PATENT DOCUMENTS

WO        99/08185        2/1999

OTHER PUBLICATIONS

International Search Report, Application No. PCT/US 00/16195, mailed Nov. 6, 2000.

* cited by examiner

Primary Examiner—Daniel H. Pan
(74) Attorney, Agent, or Firm—Rory D. Rankin; Lawrence J. Merkel

(57) ABSTRACT

A microprocessor includes general purpose registers which may be accessed or updated in portions. Dependencies may be created between an instruction which updates only a portion of a destination register and a subsequent instruction which requires a larger portion of that destination register, inclusive of the smaller updated portion, as a source. To resolve such dependencies between instructions, a determination is made upon decode of an instruction whether it updates only a portion of a destination or the entire destination. If only a portion of the destination is updated by the instruction, a read of the destination is done prior to execution of the instruction and the data read from the destination is merged with the results of the instruction execution. The merged data is then conveyed as the results of the instruction execution.

20 Claims, 4 Drawing Sheets

MERGING NARROW REGISTER FOR RESOLUTION OF DATA DEPENDENCIES WHEN UPDATING A PORTION OF A REGISTER IN A MICROPROCESSOR

BACKGROUND OF THE INVENTION

1. Field of the Invention

This invention is related to the field of superscalar microprocessors and, more particularly, to handling data dependencies between instructions in a microprocessor.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

In order to increase performance, superscalar microprocessors often employ out of order execution. The instructions within a program are ordered, such that a first instruction is intended to be executed before a second instruction, etc. One hazard of out of order execution is ensuring the intended functionality of the program is not altered. When the instructions are executed in the order specified, the intended functionality of the program is realized. However, instructions may be executed in any order as long as the original functionality is maintained. For example, a second instruction which does not depend upon a first instruction may be executed prior to the first instruction, even if the first instruction is prior to the second instruction in program order. A second instruction depends upon a first instruction if a result produced by the first instruction is employed as an operand of the second instruction. The second instruction is said to have a dependency upon the first instruction.

As used herein, a source operand of an instruction is a value to be operated upon by the instruction in order to produce a result. Conversely, a destination operand is the result of the instruction. Source and destination operands of an instruction are generally referred to as operand information. An instruction specifies the location storing the source operands and the location in which to store the destination operand. An operand may be stored in a register (a "register operand") or a memory location (a "memory operand"). As used herein, a register is a storage location included within the microprocessor which is used to store instruction results. Registers may be specified as source or destination storage locations for an instruction.

An additional difficulty which exists in the x86 instruction set architecture is the ability to update portions of registers. Typically, destination operands may be 8, 16, or 32 bits and the registers are 32 bits. Consequently, dependencies may be created when only a portion of a destination register is being updated. For example, when an instruction that updates only a portion of a destination occurs prior to a subsequent instruction which requires the entirety of the same destination as a source operand, the subsequent instruction must wait until the prior instruction has executed and produced results. In addition to the produced result, the subsequent instruction requires for its source operand the portion of the destination register that was not updated by the prior instruction. One possible solution is to wait until the instruction is retired and the result has been written to the register file. Then the subsequent instruction reads the source operand from the register file. However, if the subsequent instruction must wait until the prior instruction is retired so that it must read the entire updated register, processing delays are introduced. Alternatively, the microprocessor may include circuitry which treats 8, 16 and 32 bit operands independently. This may permit the microprocessor to update only that portion of the register which has been updated by the instruction. However, treating different portions of a register independently adds significant complexity to the microprocessor circuitry.

SUMMARY OF THE INVENTION

The problems outlined above are in large part solved by a microprocessor and method as described herein. When an instruction is decoded that updates only a portion of the destination register, a read is done of the destination register prior to execution of the instruction. When the instruction is executed, the result of the executed instruction is merged with the prior read data to form the full result register value. Advantageously, any instruction which is dependent on this result as a source operand will have its source operand provided by the prior instruction upon execution of the prior instruction. Further, since other portions of the microprocessor (e.g., load/store unit and reorder buffer) may treat all operands as 32 bits, the other portions may be simplified as they no longer need consider the size of operands.

Broadly speaking, a microprocessor is contemplated comprising a decode unit configured to decode an instruction and a functional unit configured to execute instructions. The decode unit is configured to detect when an instruction only updates a portion of a destination. In addition, the decode unit is configured to convey operand request information, a decoded instruction and operand size information. The functional unit is coupled to receive a decoded instruction, operand size information, and operand data. In addition to executing an instruction, the functional unit is configured to merge the contents of a destination of an instruction with the results of the execution of the instruction in response to detecting the instruction only updates a portion of the destination. Finally, the functional unit is configured to convey the merged data as the result of the executed instruction.

Further, a method is contemplated. An instruction is decoded. The decoding includes determining if the instruction updates only a portion of a destination. The instruction is subsequently executed to produce an execution result. If it is determined that the instruction only updates a portion of the destination, the execution result is merged with a first data. The merged result is then conveyed as the result of the instruction execution.

Further contemplated is a functional unit comprising an arithmetic logic unit, select circuitry, and a plurality of multiplexors. The arithmetic logic unit is coupled to receive operand data and size information and is configured to execute a decoded instruction to produce a first data. The select circuitry is coupled to receive destination operand size information and is configured to convey control signals. Each of the plurality of multiplexors is coupled to receive a portion of the first data, and a portion of a second data. Each multiplexor is also configured to receive a control signal from the select circuitry and are configured to convey the portion of the first data in response to detecting a first condition of the control signal, and are configured to convey the portion of the second data in response to detecting a second condition of said control signal. The conveyed portions are then merged to form a third data which is conveyed as the result of the executed instruction.

Still further contemplated is a computer system comprising a microprocessor, functional unit, and an I/O unit. The microprocessor includes a decode unit configured to decode an instruction and to detect when an instruction only updates a portion of a destination. In addition, the decode unit is configured to convey operand request information, a decoded instruction and operand size information. The functional unit is coupled to receive a decoded instruction, operand size information, and operand data. In addition to executing an instruction, the functional unit is configured to merge the contents of a destination of an instruction with the results of the execution of the instruction in response to detecting the instruction only updates a portion of the destination. Finally, the functional unit is configured to convey the merged data as the result of the executed instruction.

BRIEF DESCRIPTION OF THE DRAWINGS

Other objects and advantages of the invention will become apparent upon reading the following detailed description and upon reference to the accompanying drawings in which.

Figure 1:
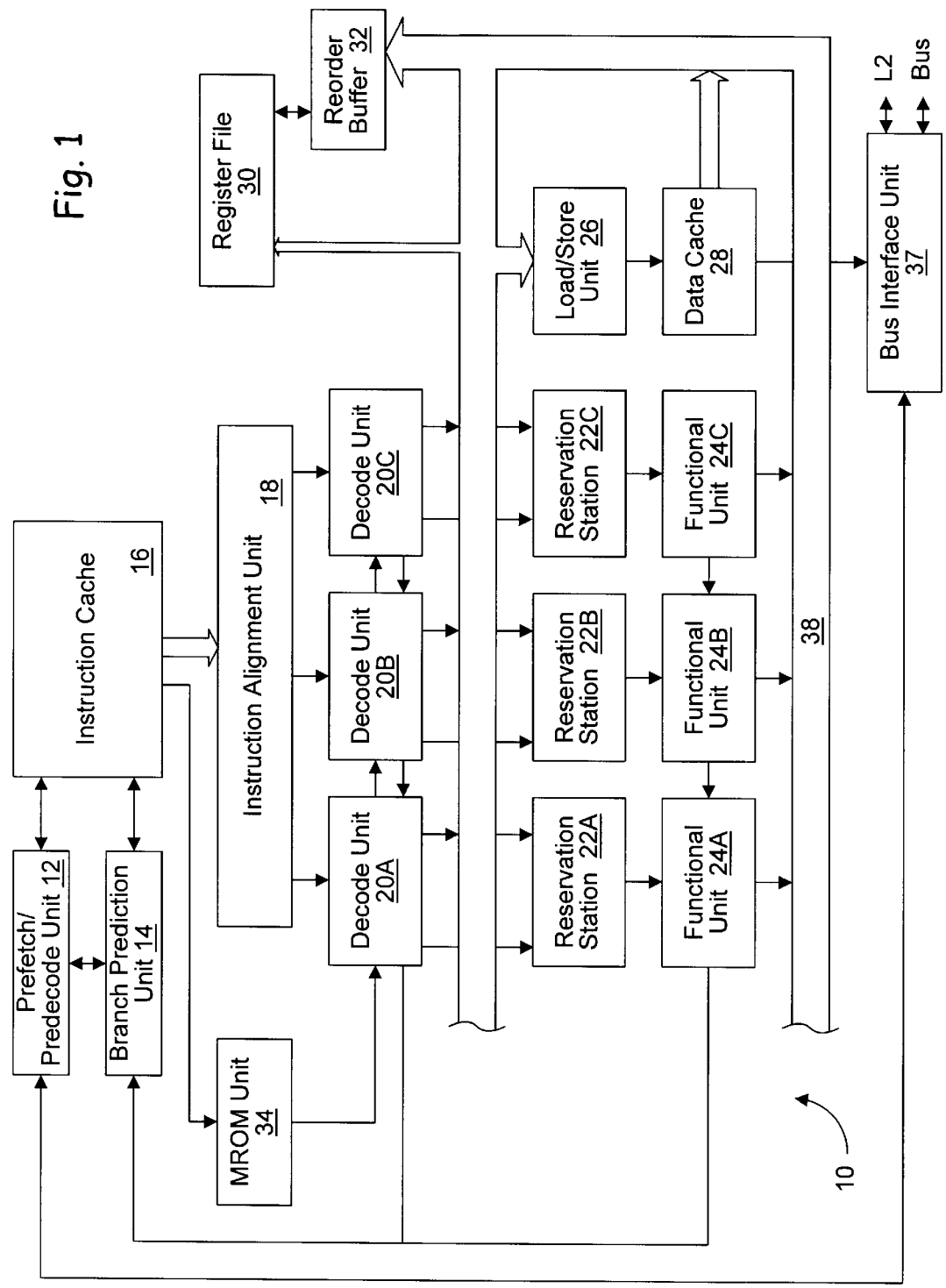
FIG. 1 is a block diagram of one embodiment of a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Processor Overview

Turning now to FIG. 1, a block diagram of one embodiment of a processor 10 is shown. Other embodiments are possible and contemplated. As shown in FIG. 1, processor 10 includes a prefetch/predecode unit 12, a branch prediction unit 14, an instruction cache 16, an instruction alignment unit 18, a plurality of decode units 20A–20C, a plurality of reservation stations 22A–22C, a plurality of funictional units 24A–24C, a load/store unit 26, a data cache 28, a register file 30, a reorder buffer 32, an MROM unit 34, and a bus interface unit 37. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from bus interface unit 37, and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to bus interface unit 37. Bus interface unit 37 is further coupled to an L2 interface to an L2 cache and a bus. Finally, MROM unit 34 is coupled to decode units 20.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2 way set associative structure having 32 byte lines (a byte comprises 8 binary bits). Alternatively, any other desired configuration and size may be employed. For example, it is noted that instruction cache 16 may be implemented as a fully associative, set associative, or direct mapped configuration.

Instructions are stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions to instruction cache 16, prefetch/predecode unit 12 generates three predecode bits for each byte of the instructions: a start bit, an end bit, and a functional bit. The predecode bits form tags indicative of the boundaries of each instruction. The. predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14. Other embodiments may employ any suitable predecode scheme.

One encoding of the predecode tags for an embodiment of processor 10 employing a variable byte length instruction set will next be described. A variable byte length instruction set is an instruction set in which different instructions may occupy differing numbers of bytes. An exemplary variable byte length instruction set employed by one embodiment of processor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identification of an instruction that includes a scale-index-base (SIB) byte is advantageous for MROM unit 34. For such an embodiment, if an instruction includes at least two bytes after the opcode byte, the functional bit for the Mod RIM byte indicates the presence of an SIB byte. If the functional bit for the Mod RIM byte is set, then an SIB byte is present. Alternatively, if the functional bit for the Mod RIM byte is clear, then an SIB byte is not present.

MROM instructions are instructions which are determined to be too complex for decode by decode units 20. MROM instructions are executed by invoking MROM unit 34. More specifically, when an MROM instruction is encountered MROM unit 34 parses and issues the instruction into a subset of defined fast path instructions to effectuate the desired operation. MROM unit 34 dispatches the subset of fast path instructions to decode units 20.

In one embodiment, MROM unit 34 detects when an instruction updates only a portion of a destination. When MROM unit 34 detects such an instruction and the portion of the destination which is not updated by the instruction is detected as being required by the instruction, a read of the destination will be done prior to execution of the instruction. The destination contents will subsequently be merged with the instruction result. On the other hand, when MROM unit 34 detects an instruction which updates only a portion of a destination and the portion of the destination which is not updated by the instruction is detected as not being required by the instruction, a read of the destination is not done.

Processor 10 employs branch prediction in order to speculatively fetch instructions subsequent to conditional branch instructions. Branch prediction unit 14 is included to perform branch-prediction operations. In one embodiment, branch prediction unit 14 employs a branch target buffer which caches up to two branch target addresses and corresponding taken/not taken predictions per 16 byte portion of a cache line in instruction cache 16. The branch target buffer may, for example, comprise 2048 entries or any other suitable number of entries. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of processor 10. In an alternative configuration, branch prediction unit 14 may be coupled to reorder buffer 32 instead of decode units 20 and functional units 24, and may receive branch misprediction information from reorder buffer 32. A variety of suitable branch prediction algorithms may be. employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction. In one particular embodiment, each instruction is decoded into up to two operations which may be separately executed by functional units 24A–24C.

Processor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e.

instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to five pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position I is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of processor 10 which employ the x86 processor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of processor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to-update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case. In embodiments in which instructions may be decoded into multiple operations to be executed by functional units 24, the operations may be scheduled separately from each other.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a compressor, receiving instructions from MROM unit 34 or reorder buffer 32 and subsequently communicating with reorder buffer 32 to complete the instructions. Additionally, functional units 24 may be configured to perform address generation for load and store memory operations performed by load/store unit 26. In one particular embodiment, each functional unit 24 may comprise an address generation unit for generating addresses and an execute unit for performing the remaining functions. The two units may operate independently upon different instructions or operations during a clock cycle.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32. It is further noted that branch execution results may be provided by functional units 24 to reorder buffer 32, which may indicate branch mispredictions to functional units 24.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a first load/store buffer having storage locations for data and address information for pending loads or stores which have not accessed data cache 28 and a second load/store buffer having storage locations for data and address information for loads and stores which have access data cache 28. For example, the first buffer may comprise 12 locations and the second buffer may comprise 32 locations. Decode units 20 arbitrate for access to the load/store unit 26. When the first buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between processor IO and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 processor architecture.

Data cache 28 is a high speed-cache memory provided to temporarily store data being transferred between load/store unit 26 and the main memory subsystem. In one embodiment, data cache 28 has a capacity of storing up to 64 kilobytes of data in an two way set associative structure. It is understood that data cache 28 may be implemented in a variety of specific memory configurations, including a set associative configuration, a fully associative configuration, a direct-mapped configuration, and any suitable size of any other configuration.

In one particular embodiment of processor 10 employing the x86 processor architecture, instruction cache 16 and data cache 28 are linearly addressed and physically tagged. The linear address is formed from the offset specified by the instruction and the base address specified by the segment portion of the x86 address translation mechanism. Linear addresses may optionally be, translated to physical addresses for accessing a main memory. The linear to physical translation is specified by the paging portion of the x86 address translation mechanism. The physical address is compared to the physical tags to determine a hit/miss status.

Bus interface unit 37 is configured to communicate between processor 10 and other components in a computer system via a bus. For example, the bus may be compatible with the EV-6 bus developed by Digital Equipment Corporation. Alternatively, any suitable interconnect structure may be used including packet-based, unidirectional or bidirectional links, etc. An optional L2 cache interface may be employed as well for interfacing to a level two cache.

Figure 2:
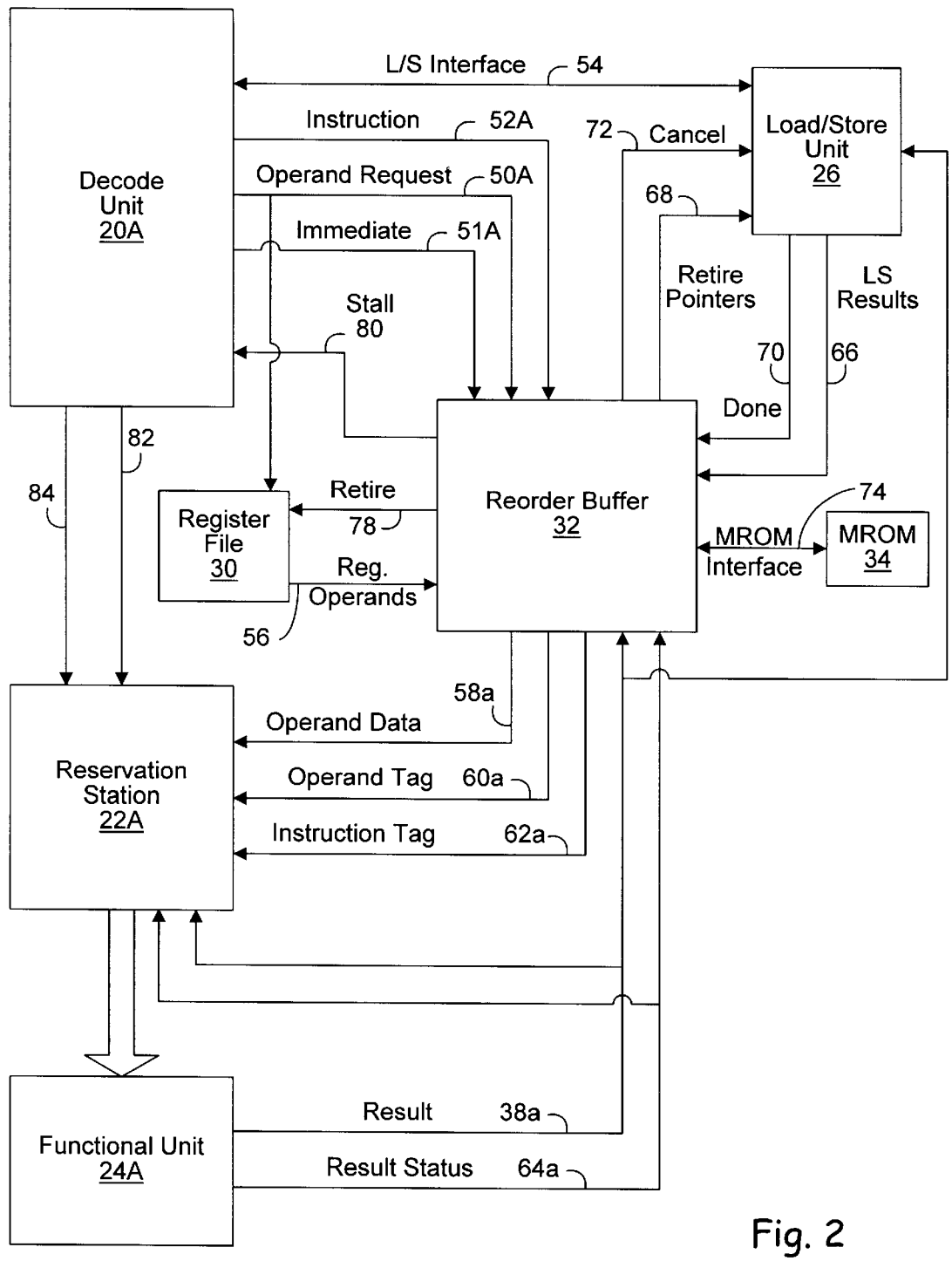
FIG. 2 is a diagram highlighting the interconnection between a decode unit, a load/store unit, an MROM unit, a functional unit, a reservation station, and a register file shown in FIG. 1, according to one embodiment of the microprocessor.

Turning next to FIG. 2, a block diagram of decode unit 20A, reservation station 22A, functional unit 24A, register file 30, reorder buffer 32, MROM 34, and load/store unit 26 is shown. Interconnection between the units is shown according to one embodiment of microprocessor 10. Other embodiments may employ other interconnection, and additional interconnection may be employed for other purposes. Interconnection between decode units 20B–20C, reservation stations 22B–22C, functional units 24B–24C and the remaining elements of FIG. 2 may be similar.

Decode unit 20A receives an instruction from instruction alignment unit 18. Decode unit 20A detects the operands used by the instruction and conveys indications of the register operands to reorder buffer 32 and register file 30 upon an operands request bus 50A. Register pointers are conveyed, and the source and/or destination nature of the operand is identified. In addition, decode unit 20A conveys a decoded instruction upon bus 82 and operand size information upon bus 84 to reservation station 22A. For the fast path instructions described above, up to two source operands may be identified, one of which is the destination operand as well. Immediate data is conveyed to reorder buffer 32 upon immediate bus 51A. Reorder buffer 32 relays the immediate data upon operand data bus 58A. Most x86 instructions specify either a second register operand or immediate data, but not both. Therefore, the portion of operand data bus 58A used to convey the second register operand value may be used to convey the immediate data. For branch instructions, the program counter address, an offset, and the predicted target address may be conveyed upon operand data bus 58A.

Decode unit 20A additionally conveys certain information regarding the instruction to reorder buffer 32 upon an instruction bus 52A. Also, when decode unit 20A detects that an instruction updates only a portion of a destination register which is not also a source operand, decode unit 20A conveys an operand request for the destination to the reorder buffer 32 and register file 30 as one of the source operands of the instruction. On the other hand, if decode unit 20A detects that an instruction destination is also a source operand, no additional operand request is required as the destination has already been requested as one of the source operands. Additionally, decode unit 20A detects load/store memory operations specified by the instruction. An indication of the memory operations is conveyed to load/store unit 26 via load/store interface 54. Additionally, load/store unit 26 may receive operand size information. For stores, load/store unit 26 may receive an indication of the number of bytes to store. For loads, load/store unit 26 may receive an indication of the number of bytes to load from memory. When load/store unit 26 receives an indication to load an amount of operand data which is only a portion of a register in size, the data loaded may be forwarded to reservation station 22A and reorder buffer 32 with an indication that the conveyed data comprises only a portion of a register in size. Subsequently, the data conveyed to reservation station 22A by load/store unit 26 is merged with register operand data by functional unit 24A to form data which corresponds to the size of the register.

While load/store unit 26, reservation station 22A, decode unit 20A and functional unit 24A are cognizant of the size of instruction operands, other parts of the microprocessor need not be concerned with operand size. Advantageously, other parts of the microprocessor may treat all data as 32 bits. For example, when decode unit 20A conveys operand requests to reorder buffer 32 and register file 30, both reorder buffer 32 and register file 30 treat all such requests as requests for 32 bits of data. Neither reorder buffer 32 nor register file 30 are given any indication of the size of the operands being requested. Consequently, circuitry may be greatly simplified as no additional circuitry is required by these other parts of the microprocessor to distinguish the varying sizes of instruction operand requests. Further, because all data within the reorder buffer is treated as 32 bits, the dependency checking circuitry within the reorder buffer may be greatly simplified as well.

As discussed above, load/store unit 26 receives size information and behaves according to that information. In addition, reservation station 22A and functional unit 24A receive operand information. When reservation station 22A detects an instruction updates only a portion of a destination and the destination in not also a source operand, reservation station may not select the instruction for execution until three operands have been received. Two of the operands required by the instruction are the source operands and the third is the destination operand which comprises the contents of the destination register prior to execution of the instruction. Subsequent to receiving the these operands, the source operands and destination operand are conveyed to functional unit 24A Following execution of the instruction, functional unit 24A merges the execution results with the prior destination operand data as described below.

When reservation station 22A detects an instruction updates only a portion of a destination and the destination is also a source operand of the instruction, only two operands are required for execution of the instruction. Subsequent to receiving the two source operands of the instruction, reservation station 22A conveys the source operand to functional unit 24A. Following execution of the instruction, functional unit 24A merges the execution results with the operand data of the destination operand as described below.

In response to the operands conveyed upon operands request bus 50A, register file 30 conveys register operand values upon register operands bus 56 to reorder buffer 32. The register values conveyed comprise the values stored in register file 30 (i.e. the values generated according to the instructions previously retired by reorder buffer 32). If reorder buffer 32 is not storing information regarding an instruction which uses the register as a destination operand, the value provided by register file 30 is conveyed to the reservation station 22A–22C which receives the instruction. For example, a register value corresponding to the instruction conveyed to reservation station 22A may be conveyed upon operand data bus 58A.

Alternatively, reorder buffer 32 may be storing information regarding an instruction which updates the requested register. If the instruction has executed and has provided an instruction result, that result is conveyed in lieu of the register value provided by register file 30 upon operand data bus 58A. If the instruction has not yet executed, the reorder buffer tag locating the instruction within reorder buffer 32 is conveyed upon an operand tags bus 60A. One operand data value and one operand tag are provided for each operand of the instruction upon operand data bus 58A and operand tags bus 60A, respectively. Additionally, validity indicators are asserted for each data and tag value by reorder buffer 32, such that reservation station 22A may discern which is being provided for a particular operand (e.g. data or reorder buffer tag).

In addition to providing operand values and tags, reorder buffer 32 provides an instruction tag for the instruction being dispatched to reservation station 22A upon an instruction tag bus 62A. The instruction tag identifies the storage location within reorder buffer 32 which stores information regarding the instruction. The instruction tag is conveyed upon result bus 38A (one of result buses 38 shown in FIG. 1) when the instruction is executed, such that the corresponding instruction result may be stored within reorder buffer 32. In one embodiment, instruction tag bus 62A conveys a line tag identifying the line of storage which stores the instruction information. The offset tag is a constant which is inherent in the issue position to which the instruction is conveyed. In other words, functional unit 24A provides results which are always stored at a particular offset within the lines of storage within reorder buffer 32.

In addition to storing the operand values and tags corresponding to an instruction, reservation station 22A receives the decoded instruction provided by decode unit 20A. When each of the source operand values, including the prior value of the destination operand when required, corresponding to the instruction have been provided by reorder buffer 32 or have been captured from result buses 38, the instruction may be selected for execution by functional unit 24A. Upon selecting the instruction for execution, reservation station 22A conveys the decoded instruction and corresponding operands to functional unit 24A.

Functional unit 24A executes instructions received from reservation station 22A and conveys the instruction tag corresponding to the instruction upon result bus 38A in addition to the instruction result generated therein. In one embodiment, the instruction tag is forwarded as the instruction begins execution but reorder buffer 32 does not receive the corresponding instruction result until the clock cycle following instruction execution. The instruction tag may be forwarded in this manner because it is unchanged during instruction execution, whereas the instruction result must be generated by functional unit 24A and then forwarded. It is noted that result bus 38A is coupled to reservation stations 22 (such as reservation station 22A shown in FIG. 2) for providing forwarded results thereto. Still further, result bus 38A is coupled to load/store unit 26. Functional unit 24A provides the logical address of a memory operation specified by the instruction being executed therein to load/store unit 26 via result bus 38A.

Functional unit 24A additionally forwards a result status upon a result status bus 64A to reorder buffer 32. The result status indicates any exceptions associated with the instruction, such that reorder buffer 32 may take appropriate corrective actions. Corrective actions may include hardware supported correction, trapping to a microcode routine within MROM unit 34, or trapping to a software routine stored at a particular address identified for the instruction. Result status bus 64A may additionally be used to indicate execution of a branch instruction which is mispredicted.

Reorder buffer 32 interfaces to load/store unit 26 to allow completion of load/store memory operations. Load/store unit 26 may be configured to speculatively execute load and store memory operations which hit in data cache 28. Load memory operation results (along with a reorder buffer tag including both line tag and offset tag portions) are conveyed upon an LS results bus 66 to reorder buffer 32. Additionally, the load results are forwarded to reservation stations 22 in order to provide operands thereto. In one embodiment, up to two results may be provided upon LS results bus 66.

Load/store unit 26 may be configured not to speculatively perform memory operations which miss data cache 28. Reorder buffer 32 indicates upon retire pointers bus 68 which memory operations are otherwise in position to be retired but have not yet executed. Load/store unit 26 then performs the indicated memory operations and returns results upon LS results bus 66. Additionally, load/store unit 26 asserts a corresponding signal upon a done bus 70. Reorder buffer 32 recognizes the asserted done signal as a completion of the memory operation indicated upon retire pointers bus 68. Since load/store unit 26 may execute up to two memory operations concurrently according to one embodiment, retire pointers bus 68 may carry up to two reorder buffer tags. Accordingly, done bus 70 includes two done signals corresponding to each of the reorder buffer tags.

A cancel bus 72 is included between reorder buffer 32 and load/store unit 26 as well. Cancel bus 72 includes a signal for each reorder buffer tag conveyed upon retire pointers bus 68. If the corresponding cancel signal is asserted, then reorder buffer 32 is indicating that the corresponding memory operation should be deleted from load/store unit 26. Memory operations are deleted when they are subsequent to a mispredicted branch or an instruction which experienced an exception, for example.

Reorder buffer 32 interfaces with MROM unit 34 via MROM interface 74. MROM interface 74 is used (among other things) to implement branch misprediction recovery for branch instructions which originate in MROM unit 34 as opposed to the original instruction stream. If a mispredicted branch is encountered and the branch instruction originated within MROM unit 34, reorder buffer 32 informs MROM unit 34 via MROM interface 74. MROM interface 74 performs branch misprediction recovery for such mispredicted branch instructions.

Instructions are retired from reorder buffer 32 in program order. Upon retirement, the corresponding register results are conveyed upon a retire bus 78 to register file 30. As noted above, the instructions within a line of storage are retired simultaneously. Since more than one instruction within the instructions may update the same register, reorder buffer 32 may employ a set of bits within each line referred to as the last in line (LIL) bits. The LIL bits are set for each instruction which is the last instruction within the line to update a particular register. One LIL bit is included for each instruction.

Finally, reorder buffer 32 employs a stall line 80 for stalling instruction dispatch. Instruction dispatch may be stalled for many reasons, including: reorder buffer, reservation station, or load/store buffer full conditions; instruction serialization; etc. Upon detection of a stall condition, reorder buffer 32 asserts a stall signal upon stall line 80. If decode unit 20A receives an asserted stall signal during a clock cycle and decode unit 20A is attempting to dispatch an instruction, decode unit 20A provides that same instruction during a subsequent clock cycle. In this manner, an instruction which cannot be dispatched during a particular clock cycle is continuously re-dispatched until the stalling condition terminates.

In one embodiment, general purpose registers of a microprocessor include 32 bits which may be accessed or updated in 8, 16 or 32 bit portions. For example, in the x86 architecture the EAX register includes 32 bits. The lower 16 bits of EAX may be referenced as AX, the lower 8 bits of EAX may be referenced as AL, and the upper 8 bits of AX may be referenced as AH.

Figure 3:
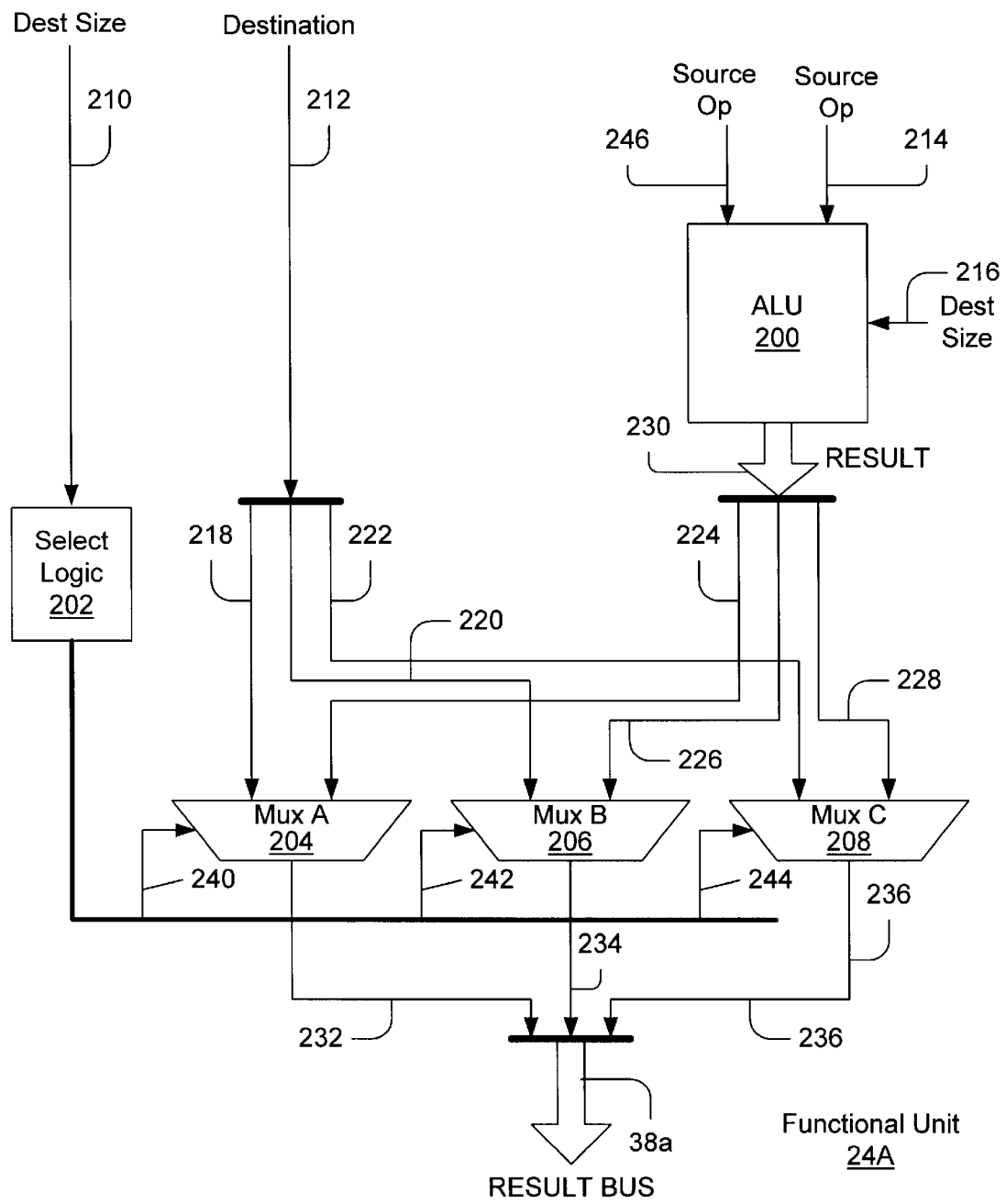
FIG. 3 is a diagram of a functional unit shown in FIG. 1, according to one embodiment of the microprocessor.

FIG. 3, which shows a block diagram of one embodiment of a functional unit 24A, will be discussed in terms of the above described microprocessor. A 32 bit general purpose register, which may be referenced as described above, will be used for illustrative purposes. Other embodiments, register sizes and methods of register referencing are contemplated as well.

Functional unit 24A includes select logic 202, ALU 200, and multiplexors 204, 206, and 208. Operands and operand information are received by functional unit 24A from reservation station 22A on buses 212, 246 and 214 as described below. In addition, decoded instruction information and operand size information are conveyed to functional unit 24A by reservation station 22A.

The instruction source operands are conveyed on operand buses 246 and 214 from reservation station 22A. In some cases, a source operand may also be a destination. When decode unit 20A detects the instruction result destination is only a portion of the destination register, the contents of the destination register are conveyed from reservation station 22A upon bus 212 and the size and location of the instruction result destination are conveyed to select logic 202 upon bus 210 and to ALU 200 upon bus 216. In one embodiment, the size information indicates the instruction result destination is 8, 16, or 32 bits. When the size indicated is 8 bits, also indicated is whether the instruction result destination is the upper or lower 8 bits of the lower 16 bits of the 32 bit destination register.

As discussed above, when decode unit 20A detects that an instruction only requires a portion of the destination register to be updated and the destination register is not used as a source operand, decode unit 20A conveys an operand request for the destination register to reorder buffer 32. Reorder buffer 32 subsequently conveys the contents of the destination register to reservation station 22A upon bus 58A. Reservation station 22A holds the instruction source and destination operands until the instruction is selected for execution. When functional unit 24A subsequently executes the instruction, the destination register data conveyed on bus 212 is merged with the results of the instruction execution as discussed below.

On the other hand, when decode unit 20A detects the destination register is used as a source operand and only a portion of the destination is updated, the contents of the source operand register are conveyed on buses 212 and 246 by reservation station 22A. Upon execution of the corresponding instruction, the portion of the source operand register data which is not used as a source operand is merged with the results of the instruction execution.

Finally, if decode unit 20A detects the entire destination register is updated by the decoded instruction, no merge is needed. In this case, the value conveyed upon bus 38a after instruction execution is the instruction result itself.

When reservation station 22A detects all operands required of an instruction have been received, the decoded instruction and operand information are conveyed to functional unit 24A for execution. When only a portion of the destination register is being updated, the contents of the destination register are conveyed upon bus 212. The upper half of the contents of the destination register is conveyed to multiplexor 204 upon bus 218. The upper portion of the lower half of the destination register is conveyed to multiplexor 206 upon bus 220 and the lower portion of the destination register is conveyed to multiplexor 208 upon bus 222.

When the instruction is selected for execution, ALU 200 executes the decoded instruction received from reservation station 22A. Prior to execution, source operands are properly aligned if necessary. For example, if AH is to be added to AL, both operands will be aligned with each other in order to correctly add them together. Additionally, execution results may be properly aligned as well. If the instruction destination is the upper 8 bits of the lower 16 bits of the destination register, the result of the executed instruction is left shifted 8 bits prior to being conveyed upon bus 230. This will ensure the result is properly conveyed on bus 226.

Following execution, the upper half of the instruction execution result 230 from ALU 200 is conveyed to multiplexor 204 upon bus 224. The upper portion of the lower half of result 230 is conveyed to multiplexor 206 upon bus 226 and the lower portion of result 230 is conveyed to multiplexor 208 upon bus 228.

Select logic 202 provides select signals 240, 242, and 244 to multiplexors 204, 206 and 208 respectively. Based on the destination size and location received upon bus 210, the select signals will determine which portions of the data fed to each multiplexor will be gated out. It is this gating out of data from multiplexors 204, 206 and 208 which will form the final result to be conveyed from functional unit 24A upon bus 38a.

When the destination of an instruction is the lower portion of the lower half of a register, the contents of bus 218 are gated out, the contents of bus 220 are gated out, and the contents of bus 228 are gated out. When the destination is the upper portion of the lower half, the contents of bus 218 are gated out, the contents of bus 226 are gated out, and the contents of bus 222 are gated out. When the destination is the lower half, the contents of bus 218 are gated out, the contents of bus 226 are gated out, and the contents of bus 228 are gated out. Finally, if the destination is the entire register, then buses 224, 226, and 228 are gated out.

After execution of an instruction, the data conveyed-on buses 232, 234 and 236 are conveyed upon bus 38a as the result of the instruction execution. In this manner, the results of instruction execution and previous data are merged to form data which is conveyed as the result of the instruction. Subsequent instructions which require the prior instruction result as a source, receive the merged data as the their source.

Figure 4:
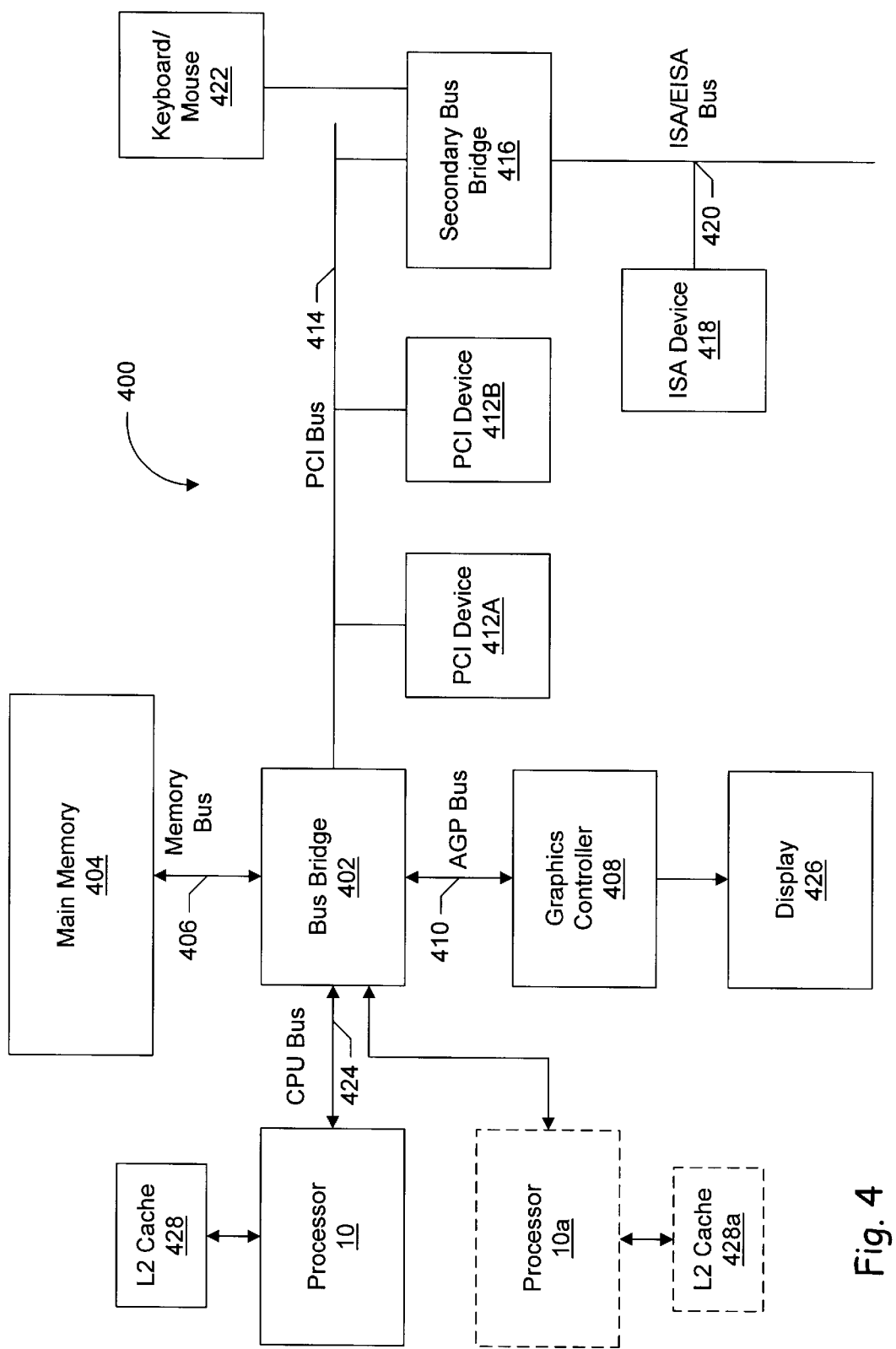
FIG. 4 is a block diagram of a computer system incorporating the microprocessor shown in FIG. 1.

Turning now to FIG. 4, a block diagram of one embodiment of a computer system 400 including processor 10 coupled to a variety of system components through a bus bridge 402 is shown. Other embodiments are possible and contemplated. In the depicted system, a main memory 404 is coupled to bus bridge 402 through a memory bus 406, and a graphics controller 408 is coupled to bus bridge 402 through an AGP bus 410. Finally, a plurality of PCI devices 412A–412B are coupled to bus bridge 402 through a PCI bus 414. A secondary bus bridge 416 may further be provided to accommodate an electrical interface to one or more EISA or ISA devices 418 through an EISA/ISA bus 420. Processor 10 is coupled to bus bridge 402 through a CPU bus 424 and to an optional L2 cache 428.

Bus bridge 402 provides an interface between processor 10, main memory 404, graphics controller 408, and devices attached to PCI bus 414. When an operation is received from one of the devices connected to bus bridge 402, bus bridge 402 identifies the target of the operation (e.g. a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may further incorporate additional functionality, as desired. An input/output controller (not shown), either external from or integrated with secondary bus bridge 416, may also be included within computer system 400 to provide operational support for a keyboard and mouse 422 and for various serial and parallel ports, as desired. An external cache unit (not shown) may further be coupled to CPU bus 424 between processor 10 and bus bridge 402 in other embodiments. Alternatively, the external cache may be coupled to bus bridge 402 and cache control logic for the external cache may be integrated into bus bridge 402. L2 cache 428 is further shown in a backside configuration to processor 10. It is noted that L2 cache 428 may be separate from processor 10, integrated into a cartridge (e.g. slot 1 or slot A) with processor 10, or even integrated onto a semiconductor substrate with processor 10.

Main memory 404 is a memory in which application programs are stored and from which processor 10 primarily executes. A suitable main memory 404 comprises DRAM (Dynamic Random Access Memory). For example, a plurality of banks of SDRAM (Synchronous DRAM) or Rambus DRAM (RDRAM) may be suitable.

PCI devices 412A–412B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures which can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional processors (e.g. processor 10a shown as an optional component of computer system 400). Processor 10a may be similar to processor 10. More particularly, processor 10a may be an identical copy of processor 10. Processor 10a may be connected to bus bridge 402 via an independent bus (as shown in FIG. 4) or may share CPU bus 424 with processor 10. Furthermore, processor 10a may be coupled to an optional L2 cache 428a similar to L2 cache 428.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Numerous variations and modifications will become apparent to those skilled in the art once the above disclosure is fully appreciated. It is intended that the following claims be interpreted to embrace all such variations and modifications.

What is claimed is:

1. A microprocessor comprising:
   a decode unit configured to decode an instruction, wherein said decode unit is configured to detect said instruction only updates a portion of a destination, wherein said decode unit is configured to convey operand request information, and wherein said decode unit is configured to convey a decoded instruction and operand size information;
   a functional unit coupled to receive said decoded instruction and said operand size information, and wherein said functional unit is coupled to receive operand data, and wherein said functional unit is configured to execute said decoded instruction, and wherein said functional unit is configured to merge a contents of said destination with results of said execution of said decoded instruction in response to detecting said instruction only updates a portion of said destination, and wherein said functional unit is configured to convey said merged data as a result of said execution.

2. The microprocessor of claim 1, further comprising a reorder buffer coupled to receive operand request information from said decode unit, and wherein said reorder buffer is configured to convey operand data.

3. The microprocessor of claim 2, further comprising a reservation station coupled to receive said decoded instruction and said operand size information from said decode unit, and wherein said reservation station is coupled to receive said operand data from said reorder buffer, and wherein said reservation station is configured to hold said decoded instruction, said operand data, and said operand size information, and wherein said reservation station is configured to convey said decoded instruction, said operand data, and said operand size information to said functional unit.

4. The microprocessor of claim 3, wherein said reservation station is configured to detect a destination register of an instruction is not also a source operand of said instruction, and wherein said reservation station is configured to detect said instruction only updates a portion of a said destination.

5. The microprocessor of claim 1, wherein said operand size information indicates an entire register or a portion thereof.

6. The microprocessor of claim 5, wherein said operand size information indicates a position of said portion within said register.

7. A method comprising:
   decoding an instruction, said decoding including determining if said instruction updates only a portion of a destination;
   executing said instruction to produce an execution result;
   merging said execution result with first data, said first data comprising a portion of the contents of a source operand register of said instruction prior to execution of said instruction, in response to said determining that said instruction updates only said portion of said destination and said destination is also a source operand register of said instruction;
   conveying a result of said merging as a result of said instruction.

8. The method of claim 7, wherein said results of said execution comprises 8 bits, and wherein said first data comprises 24 bits.

9. The method of claim 7, wherein said results of said execution comprises 16 bits, and wherein said first data comprises 16 bits.

10. A functional unit comprising:
    an arithmetic logic unit configured to execute a decoded instruction, wherein said unit is coupled to receive source operand data, and wherein said unit is coupled to receive operand size information, and wherein said execution produces a first data;
    select circuitry coupled to receive destination operand size information, wherein said circuitry is configured to convey control signals;
    a plurality of multiplexors, wherein each of said multiplexors are coupled to receive a portion of said first data, and wherein said multiplexors are coupled to receive a portion of a second data, and wherein said multiplexors are coupled to receive a control signal from said circuitry, and wherein said multiplexors are configured to convey said portion of said first data in response to detecting a first condition of said control signal, and wherein said multiplexors are configured to convey said portion of said second data in response to detecting a second condition of said control signal, and wherein said conveyed portions are merged to form a third data, and wherein said third data is conveyed as a result of said executed instruction.

11. The functional unit of claim 9, wherein said operand size information includes a position of said operand within an operand register, and wherein said destination operand size information includes a position of said destination operand within an operand register.

12. The functional unit of claim 9, wherein said second data comprises either the contents of a source operand register which is also a destination register of said instruction prior to said execution of said instruction or the contents of a destination operand register which is not also a source operand register of said instruction prior to said execution.

13. The functional unit of claim 9, wherein said first condition of said control signal indicates said portion of said first data represents a destination of said instruction, and wherein said second condition of said control signal indicates said portion of said first data does not represent a destination of said instruction.

14. A computer system comprising:
    a microprocessor, wherein said microprocessor includes,
    A decode unit configured to decode instructions, wherein said decode unit is configured to convey operand request information, and wherein said decode unit is configured to convey a decoded instruction and operand size information, and wherein said decode unit is configured to detect said instruction only updates a portion of a destination, and wherein said decode unit conveys an indication of said detection;

a functional unit coupled to receive a decoded instruction and operand size information, and wherein said functional unit is coupled to receive said indication, and wherein said functional unit is coupled to receive said contents, and wherein said functional unit is configured to execute an instruction, and wherein said functional unit is configured to merge said contents with results of said execution of said instruction upon detection of said indication, and wherein said functional unit is configured to convey said merged data; and an I/O device.

15. The computer system of claim 14, wherein the I/O device is a modem.

16. The computer system of claim 14, further comprising a reorder buffer coupled to receive operand request information from said decode unit, and wherein said reorder buffer is configured to convey operand data.

17. The computer system of claim 14, further comprising a reservation station coupled to receive said decoded instruction and said operand size information from said decode unit, and wherein said reservation station is coupled to receive said operand data from said reorder buffer, and wherein said reservation station is configured to hold said decoded instruction, said operand data, and said operand size information, and wherein said reservation station is configured to convey said decoded instruction, said operand data, and said operand size information to said functional unit.

18. A method comprising:

decoding an instruction, said decoding including determining if said instruction updates only a portion of a destination;

executing said instruction to produce an execution result;

merging said execution result with first data, said first data comprising a portion of the contents of said destination of said instruction, in response to said determining that said instruction updates only said portion of said destination and said destination is not also a source operand register of said instruction;

conveying a result of said merging as a result of said instruction.

19. The method of claim 18, wherein said results of said execution comprises 8 bits, and wherein said first data/ comprises 24 bits.

20. The method of claim 18, wherein said results of said execution comprises 16 bits, and wherein said first data comprises 16 bits.

* * * * *

UNITED STATES PATENT AND TRADEMARK OFFICE
CERTIFICATE OF CORRECTION

PATENT NO. : 6,493,819 B1
APPLICATION NO. : 09/442209
DATED : December 10, 2002
INVENTOR(S) : Mahurin et al.

It is certified that error appears in the above-identified patent and that said Letters Patent is hereby corrected as shown below:

Claim 11, col. 18, line 45, please delete "9" insert --10-- in place thereof.

Claim 12, col. 18, line 50, please delete "9" insert --10-- in place thereof.

Claim 13, col. 18, line 56, please delete "9" insert --10-- in place thereof.

Claim 14, col. 19, lines 8-9, please delete "said contents" insert --operand data-- in place thereof.

Claim 14, col. 19, line 11, please delete "said contents" insert --operand data-- in place thereof.

Claim 17, col. 19, line 22, please delete "14" insert --16-- in place thereof.

Signed and Sealed this

Sixth Day of February, 2007

JON W. DUDAS
*Director of the United States Patent and Trademark Office*